Patented Apr. 11, 1944

2,346,498

UNITED STATES PATENT OFFICE 2,346,498

STABILIZATION OF CELLULOSE ESTERS

Carl J. Malm and Carlton L. Crane, Rochester, N. Y., assignors to Eastman Kodak Company, Rochester, N. Y., a corporation of New Jersey No Drawing. Application March 10, 1941, Serial No. 382,584

8 Claims. (Cl. 260—230)

This application relates to the stabilization of cellulose esters by a process which involves kneading or mixing of the cellulose ester while in the form of a doughy mass in a mixture of a water-miscible solvent and water accompanied by maintaining the pH of the liquid above 6 by adding a neutralizing agent at frequent intervals during the mixing until a constant pH is attained.

Various methods of stabilizing cellulose esters have been suggested previously. Many of these methods, especially when concerned with the stabilization of high moisture-resistant cellulose esters, have involved the use of elevated temperatures and sometimes elevated pressures.

One object of our invention is to provide a method of stabilizing cellulose esters, particularly those having a substantial higher acyl content, efficiently at normal temperatures. Another object of our invention is to provide a method of stabilizing fatty acid esters of cellulose in which the resulting product is in a physical form suitable for direct use or may be easily converted to a powder form. Other objects of our invention will appear herein.

We have found that a cellulose ester may be easily stabilized by mixing it with water and a water-miscible solvent under conditions which will make the cellulose ester form a doughy mass which separates from a clear liquid while imparting a pH of at least 6 at intervals to the clear liquid.

The resulting product has excellent stability as indicated by a high char point. Any fatty acid ester of cellulose which when treated with a water-miscible solvent and water can be formed into a doughy mass which separates from part of the liquid can be stabilized in accordance with our invention. Whether or not a given water-miscible organic solvent will give the above results, depends upon the content of higher acyl groups of the ester and its degree of hydrolysis.

The criterion of whether or not a cellulose ester may be stabilized in accordance with our invention is whether or not it will form a doughy mass with a mixture of water and a water-miscible solvent whereby the doughy mass separates from some of the water-solvent mixture. If a cellulose ester does not exhibit these properties, it is ordinarily due to a too small content of hydroxyl groups and in that case, further hydrolysis is desirable. However, other factors may influence the behavior of the cellulose ester, such as the use of a solvent which is not the best-adapted for the particular ester treated.

Our stabilizing method is especially adapted to the esters which are highly moisture resistant and because of this, heretofore have been difficult to stabilize. Examples of esters of this type are those which contain a high percentage of propionyl, butyryl, stearyl or other fatty acid groups of more than two carbon atoms. We have found that with these esters, having a high percentage of higher acyl content, little or no hydrolysis is required to enable the esters to form a doughy mass to be suitable for stabilization in accordance with our invention. However, esters of this type, even though they are partially hydrolyzed, are also susceptible to stabilization by our method. In the case of the fatty acid esters of cellulose having little or no higher acyl, it is only the esters which have been partially hydrolyzed that will form a dough-liquid mass with a water-miscible solvent, even though the unhydrolyzed ester is soluble in the solvent. Also, whether a cellulose ester may be stabilized by our process depends upon the solvent which is used in forming the doughy mass. For instance, a particular inert water-miscible organic solvent may be quite suitable to form a doughy mass of a cellulose ester while with the same cellulose ester, another solvent may not be very satisfactory in forming a dough-liquid mass. For instance, a cellulose acetate propionate, having a propionyl content of 15% and approximately ½ free hydroxyl groups per 24 cellulose carbon atoms, will give a dough-liquid mass with a mixture of methyl ethyl ketone and water, while, on the other hand, this ester will not form a dough-liquid mass with a mixture of acetone and water.

It is necessary with the esters having a low content of higher acyl that some hydrolysis be used to put the cellulose ester in a form suitable for stabilizing by our invention. For instance, unhydrolyzed cellulose acetate butyrates, having respectively 10, 8 and 6% butyryl content, have all been tested in mixtures of various proportions of methyl ethyl ketone-water and acetone-water and no one of them would give a plastic or doughy mass. The first two esters were soluble in acetone while the latter was insoluble. However, it was found that if these esters were partially hydrolyzed, the solubility characteristics were changed sufficiently that they would give a dough-liquid mass and could thereby be stabilized in accordance with our invention. It may be stated, as a general approximation to guide the individual operator, that in the case of cellulose esters, which must be hydrolyzed to be stabilized by our invention, that an ester will ordinarily form a dough-liquid mass when it contains at least 3 to 4% less acyl than that contained in the ester at the point where acetone solubility is first obtained. For instance, in the case of the cellulose acetate butyrates referred to, it was necessary to hydrolyze that having a 6% butyryl content further than one having a 10% butyryl content in order to get an ester which would form a dough-liquid mass so that it could be stabilized in accordance with the stabilizing process described herein. This illustrates what may be stated as a general rule, namely, that with the mixed esters of cellulose, the degree of hydrolysis of the ester necessary to obtain one which will give a dough-liquid mass is roughly inversely proportional to the amount of higher acyl in the ester. Thus in the case of the cellulose acetate butyrates referred to, the amount of hydrolysis necessary was least in the case of the ester having 10% butyryl, greater in the case having 8% butyryl and greatest in the one having 6% butyryl to obtain an ester susceptible to stabilization by our invention. Ordinarily, cellulose acetate propionates, require slightly more hydrolysis than do cellulose acetate butyrates of corresponding butyryl content to be susceptible to the formation of a dough-liquid mass. With esters having a corresponding content of acyl higher than butyryl, the degree of hydrolysis necessary will be even less than required to impart dough-forming characteristics to cellulose acetate butyrate.

In stabilizing cellulose esters in accordance with our invention, the only requisite of the organic solvent which is used is that it is inert, water-miscible and when mixed with water forms a dough-liquid mass with the cellulose ester. We have found that the most suitable solvents, which exhibit these properties, are the lower boiling ketones, particularly acetone and methyl ethyl ketone. Other solvents, such as dioxan, may be employed; however, because of its boiling point, it is not as easily recovered from the water with which it is mixed as the ketones which have a boiling point substantially below the boiling point of water.

In its broader aspects, our invention comprises a stabilization process in which a washed fatty acid ester of cellulose is first mixed with water and an inert, water-miscible organic solvent so as to form a dough-liquid mass. The water present may be there as the result of the direct use of a cellulose ester as it comes from the washing steps without drying or it may be added, such as where a dry ester is employed or where a wet ester does not supply a sufficient amount of water to the mass. After the dough-liquid mass has been formed by a mixing or kneading operation, such as by the use of a vessel having a mixing or kneading apparatus therein, a small amount of a neutralizing agent is added to the liquid for the purpose of raising its pH to more than 6, preferably to a pH of 6–7. The mixing or kneading is continued and samples of the liquid are taken at intervals and tested for pH. Sufficient additional neutralizing agent is then added to bring the pH back to at least 6 and preferably between 6 and 7. Satisfactory intervals for testing and adding additional neutralizing agent are of 15 minutes, although, of course, this will depend upon the individual operator. This mixing or kneading is continued until the pH becomes constant as shown by the same pH in 2 successive tests whereupon the liquid, with which the doughy mass is contacted, may be separated therefrom such as by decantation. If desired, the dough may be filtered by forcing it thru a fine mesh screen. The dough may then be directly worked up, particularly if the solvent employed in the stabilization is to be employed in making products therefrom or, if desired the cellulose ester may be isolated by addition of water. The latter treatment extracts solvent from the dough making it harden and break into small pieces. By boiling to drive off the remaining solvent and drying, the cellulose ester is obtained in a form sufficiently brittle so that it can be broken up into a readily dissolved powder in a grinding or milling operation, such as by means of a hammer mill.

Any water-soluble, neutralizing agent which raises the pH, and is water soluble may be employed. Neutralizing agents of this type, which have been found to be particularly suitable, are magnesium carbonate, ammonia, urea and sodium bicarbonate. It is desirable to avoid the use of alkaline materials which are so strongly alkaline that there may be danger of hydrolysis of the cellulose ester therewith. However, with the use of extreme care, it is possible that such alkaline agents might be used without severely decreasing the acyl content of the ester being treated.

The proportion of solvent to water in stabilizing processes, in accordance with our invention, will vary depending upon the composition of the ester and the condition of operation. That this proportion may be varied is shown by the examples herein. One of the factors which governs the proportion of solvent to water to employ is the degree of hydrolysis of the ester. We have found, as a general rule, that the greater the degree of hydrolysis of a given ester, the less solvent which is needed to form a dough-liquid mass and to facilitate the stabilization of the ester. The cellulose esters having the highest higher acyl contents require larger proportions of solvent to water than do the cellulose esters having a content of higher acyl which is moderate or low. If in the stabilizing process the ratio of solvent-water to cellulose ester is high, it is desirable to use a less ratio of solvent to water. For example, three parts of liquid to one of cellulose ester is a satisfactory proportion with which to work. However, it is to be understood that this figure is merely illustrative and the amount of liquid to ester employed may vary considerably from one case to another depending on the conditions of operation and the ease with which a given proportion of liquid to ester may be used in the equipment in which the process is carried out. When stabilizing the higher viscosity cellulose esters, it is desirable to employ a higher proportion of solvent to water in order to form a dough-liquid mass of good workability. With an elevated temperature, on the other hand, a less proportion of solvent is necessary to assure a nicely workable mass. It is desirable, however, but not necessary, to limit the temperature of operation of our stabilization process, particularly where low boiling solvents are being employed to prevent waste of solvent. The amount of organic solvent employed in our process should be sufficient to render the cellulose ester in a doughy condition so that it may be readily mixed or kneaded without putting an undue strain on the mixing apparatus, although obviously where this is a minor consideration a heavy dough may be satisfactorily employed in our stabilizing process.

The following examples illustrate the stabilizing of cellulose esters in accordance with our invention:

Example I 2000 lbs. of cellulose acetate butyrate, having a butyryl content of 37% and an acetyl content of 13%, after thoroughly washing and while still containing approximately 2000 lbs. of water, was mixed with 4000 lbs. of aqueous acetone of 75% strength in a Werner-Pfleiderer mixer. After a few minutes, a very heavy, whitish dough was formed together with a clear, supernatant liquid. The mixing was continued and every 15 minutes a sample of the liquid was taken and the pH was determined. The first sample showed a pH of 3–4. After each test, a small amount of magnesium carbonate was added, thus raising the pH to above 6.5. At the end of approximately four hours, the pH had stayed at 6.5 for one whole 15 minute period. The mixing was stopped and the supernatant liquid was decanted off. Fresh water was added to the mixer and the mixing was started again. After about 15 minutes, the dough was hardened and broken up into small pieces. The contents of the mixer were dumped into a false bottom tank with a boiling coil. The water was drained off and fresh water was added. The acetone present was removed by boiling. The excess water was removed and the product was dried to less than 5% water. The coarse, hardened lumps of cellulose acetate butyrate, which were obtained, were passed through a hammer mill. The resulting product was a fine, fluffy powder with good stability towards heat.

Example II 5.5 lbs. of cellulose acetate butyrate, having an acetyl content of 13.7%, a butyryl content of 36.5% and a viscosity of 205 cps. in 10 parts of acetone at 25° C. which had been washed free of acids with distilled water but not dried and which contained 6.7 lbs. of distilled water, was mixed with 1.6 lbs. of distilled water and 8.3 lbs. of acetone in a Werner-Pfleiderer mixer. The mixer was run until a uniform plastic mass was obtained, whereupon the pH reading of the supernatant liquid was raised to approximately 7 with magnesium carbonate. After the pH of the liquid became constant, the supernatant liquid was drained therefrom and the plastic mass was covered with 16.6 lbs. of a mixture of equal parts of acetone and distilled water. The mass was mixed for two hours. It was then drained thoroughly and covered with distilled water and the mixing was continued for one hour. The mass lost its plastic form and regained a hard, fibrous appearance. The mass was well washed with distilled water and dried. The product may be used in this form or run through a hammer mill and reduced to a powder form. It exhibited a melting point of 185° C., char point of 295° C. and gave only a clear light amber color when treated for eight hours at 180° C.

Example III

1½ lbs. of a cellulose acetate butyrate with an acetyl content of 12.9% and a butyryl content of 36.9,% viscosity in 10 parts of acetone of 219 cps. at 25° C. which had been thoroughly washed and dried, was mixed in a Werner-Pfleiderer mixer with 1½ lbs. of a mixture of equal parts of acetone and distilled water for one hour. After a doughy mass was formed, the pH reading of the supernatant liquid was adjusted to 6.9 with magnesium carbonate. The pH of the liquid was determined at intervals and any drop in the pH was compensated for by adding more magnesium carbonate to the mass. When the pH reading became constant at 6.9, the mass was drained thoroughly and covered with 1½ lbs. of a mixture of equal parts of acetone and distilled water and the mixer was run one hour. The product was drained thoroughly, washed with distilled water and dried. The resulting cellulose acetate butyrate has a melting point of 195° C. and a char point of 300° C. The product also exhibited good heat stability when heated for eight hours at 180° C.

Example IV 15 lbs. of a dry cellulose acetate butyrate with an acetyl content of 15%, a butyryl content of 37.9%, and a viscosity of 8.3 cps. in 10 parts of acetone at 25° C., was treated with 22½ lbs. of 70% aqueous acetone in a Werner-Pfleiderer mixer until a plastic mass was formed. The pH reading of the supernatant liquid was adjusted at intervals with magnesium carbonate until the pH remained constant for one hour at a value of 6.9. The supernatant liquid was thoroughly drained from the mass and it was covered with distilled water. The mass was washed by stirring in distilled water for one-half hour and this washing treatment was repeated three times. The material was thoroughly drained and dried. The resulting cellulose acetate butyrate had a melting point of 153° C. and a char point of 300° C. The material showed good heat stability, as indicated by giving only a light, clear melt after eight hours at 180° C.

Example V 7 lbs. of dried cellulose acetate butyrate with an acetyl content of 12.7%, a butyryl content of 40.6%, and a viscosity of 113 cps. in 10 parts of acetone at 25° C., was mixed in a Werner-Pfleiderer type mixer with 10.5 lbs. of 68% aqueous acetone until a uniform plastic mass was obtained. The pH reading of the supernatant liquid was adjusted to a value of 6.8 at intervals with continued mixing. When the pH reading became constant at this value, the supernatant liquid was thoroughly drained from the mass and it was covered with 10½ lbs. of 68% aqueous acetone. Stirring was continued for one hour. The mass was drained thoroughly and was given two one-half hour washes and two one hour washes in distilled water with mixing. The product was drained. The resulting cellulose acetate butyrate had a melting point of 184° C., and a char point of 305° C. The cellulose ester gave a good, clear, light colored melt after heating for eight hours at 180° C. and only a very slight yellow color when heated eight hours at 160° C. with an equal part of dibutyl phthalate.

Example VI 8 lbs. of cellulose acetate stearate was mixed with 24 lbs. of 37.7% aqueous methyl ethyl ketone. When thoroughly mixed, the temperature of the mass was raised to 90° F. The mass then became nicely plastic. The pH reading of the supernatant liquid was adjusted to 6.7 with sodium bicarbonate and was adjusted at repeated intervals throughout the mixing or kneading operation. When testing of the pH showed that it had been constant for one hour, the liquid was drained off and the mass was covered with approximately 8 lbs. of aqueous methyl ethyl ketone at 30% strength. The mixer was run for one hour. The liquid was thoroughly drained off and the mass was given two one-half hour washes and two two-hour washes of distilled water accompanied by mixing. The liquid was drained off and the mass was dried. The analyses of the original and the treated product are as follows:

|  | Original | Treated |
| --- | --- | --- |
| Melting point | 150° C | 150° C. |
| Char point | 230° C | 250° C. |
| Heated at 160° C | Decomposed one-half hour. | Dark brown in 8 hrs. |
| Acetyl | 17.4% | |
| Stearyl | 47.3% | |
| Viscosity | 19 cps. 10% in acetone at 25° C. | |

Example VII 2 lbs. of a cellulose acetate butyrate with an acetyl content of 12.3% and a butyryl content of 36.9%, and a viscosity of 219 cps. in 10 parts of acetone at 25° C., was mixed with 4 lbs. of a mixture of equal parts of methyl ethyl ketone and distilled water. When the mass became uniform, the pH reading of the supernatant liquid was adjusted at intervals during the mixing to a constant value of 7.6 with magnesium carbonate. The mass was then drained and given five one-half hour washes with distilled water in the mixer. It was then drained thoroughly and dried. The cellulose acetate butyrate has a melting point of 183° C. and a char point of 295° C. The product gave a clear, light melt after 8 hours at 180° C.

Example VIII 5 lbs. of cellulose acetate was mixed with approximately 20 lbs. of 46% aqueous methyl ethyl ketone at 90° F. The pH reading of the supernatant liquid was adjusted to a constant value of 7.3. When the pH became constant, the supernatant liquid was drained from the plastic mass and it was given five one-half hour washes in distilled water in the mixer. The liquid was drained therefrom and the mass was dried. The melting points and char points of the cellulose acetate normally processed compared with that treated in accordance with our invention is as follows:

|  | Acetyl | Melting point | Char point |
| --- | --- | --- | --- |
|  | Per cent | ° C. | ° C. |
| Normally processed material | 38.5 | 241 | 290 |
| Treated material | 38.5 | 215 | 297 |

An advantage of my invention is that the gap between the melting point and the char point of the lower fatty acid esters of cellulose is widened thus contributing to the value of those esters for use in processes involving melting operations. The benefit is especially pronounced in the case of hydrolyzed cellulose esters as not only are the char points raised but the melting points of those esters are lowered. This is especially beneficial in plastics or like arts where improved flow at a given temperature is desirable.

In the case of the fully esterified cellulose esters the char points are raised being evidence of improved stability, while the melting points remain substantially unchanged except in the case of the esters which before the stabilization treatment showed a low melting point due to decomposition.

In my process the cellulose ester upon treatment with a mixture of solvent and water is converted into a gelatinous doughy mass which is immersed usually partially in liquid. In the carrying out of the stabilization the soft solid material is worked into the liquid so that intimate contact is maintained between the liquid and the dough. The term "dough-liquid mass" as used herein refers to the two-phase mass composed of the softened cellulose ester and the water and solvent which contacts the softened cellulose ester but are in the liquid phase.

In my process after the formation of the dough-liquid mass it is desirable to raise the pH above 6 and keep it above 6 over the entire stirring operation altho there is no danger in allowing the pH to drop below 6 at intervals. The term "maintaining the pH above 6" as used herein is to be understood as taking into account the lapses below 6 which will ordinarily occur to some extent between the intervals at which the pH is restored to above 6. As these lapses merely prolong the stabilizing process without being harmful to the cellulose ester, the term "maintaining" is employed in the sense that generally during the stabilization the pH will be at least 6.

We claim:

1. A method for stabilizing fatty acid esters of cellulose which comprises stirring a cellulose fatty acid ester selected from the group consisting of (1) the cellulose esters at least some of the fatty acid groups of which have more than two carbon atoms and (2) the partially hydrolyzed cellulose acetates, with a mixture of a water-miscible organic solvent inert to the operative conditions of the method, and water, with which mixture it forms a dough-liquid mass, continuing the stirring while maintaining a pH in the liquid mixture of at least 6 but which will not appreciably hydrolyze the cellulose ester by adding a neutralizing agent at frequent intervals during the stirring until a constant pH of the liquid mixture is attained.

2. A method for stabilizing fatty acid esters of cellulose which comprises stirring a cellulose fatty acid ester selected from the group consisting of (1) the cellulose esters at least some of the fatty acid groups of which have more than two carbon atoms and (2) the partially hydrolyzed cellulose acetates, with a mixture of a water-miscible organic solvent inert to the operative conditions of the method, and water, with which mixture it forms a dough-liquid mixture of at least 6 but which will not appreciably hydrolyze the cellulose ester by adding magnesium carbonate at frequent intervals during the stirring until a constant pH of the liquid mixture is attained.

3. A method for stabilizing fatty acid esters of cellulose which comprises stirring a cellulose fatty acid ester selected from the group consisting of (1) the cellulose esters at least some of the fatty acid groups of which have more than two carbon atoms and (2) the partially hydrolyzed cellulose acetates, with a mixture of a water-miscible organic solvent inert to the operative conditions of the method, and water, with which mixture it forms a dough-liquid mass, continuing the stirring while maintaining a pH in the liquid mixture of at least 6 but which will not appreciably hydrolyze the cellulose ester, by adding a neutralizing agent at frequent intervals during the stirring until a constant pH of the liquid mixture is attained, decanting the liquid from the doughy mass, immersing the doughy mass in water and boiling the water surrounding the doughy mass to drive off at least a major portion of the solvent therefrom.

4. A method of stabilizing cellulose acetate butyrate which comprises stirring it with a mixture of a water-miscible solvent inert under the operative conditions of the method, and water, which mixture forms with the cellulose ester a dough-liquid mass, continuing the stirring while maintaining a pH in the liquid mixture of at least 6 but which will not appreciably hydrolyze the cellulose ester, by adding a neutralizing agent at frequent intervals during the stirring until a constant pH of the liquid mixture is attained.

5. A method of stabilizing fatty acid esters of cellulose which comprises stirring a cellulose fatty acid ester selected from the group consisting of (1) the cellulose esters at least some of the fatty acid groups of which have more than two carbon atoms and (2) the partially hydrolyzed cellulose acetates, with a mixture of a low boiling ketone and water which forms with the cellulose ester a dough-liquid mass, continuing the stirring while maintaining a pH in the liquid mixture of at least 6 but which will not appreciably hydrolyze the cellulose ester, by adding a neutralizing agent at frequent intervals during the stirring until a constant pH of the liquid mixture is attained.

6. A method of stabilizing cellulose acetate butyrate which comprises stirring it with a mixture of a low boiling ketone and water which forms with the cellulose ester a dough-liquid mass, continuing the stirring while maintaining a pH in the liquid mixture of at least 6 but which will not appreciably hydrolyze the cellulose ester, by adding a neutralizing agent at frequent intervals during the stirring until a constant pH of the liquid mixture is attained.

7. A method of stabilizing cellulose acetate butyrate which comprises stirring the mixture of acetone and water with which it will form a dough-liquid mass, continuing the stirring while maintaining a pH in the liquid mixture of at least 6 but which will not appreciably hydrolyze the cellulose ester, by adding magnesium carbonate at frequent intervals during the stirring until a constant pH of the liquid mixture is obtained, then separating the dough from the liquid by decanting the liquid therefrom.

8. A method of stabilizing a partially hydrolyzed cellulose acetate which will form a dough-liquid mass with methyl ethyl ketone and water, which comprises stirring the cellulose acetate with aqueous methyl ethyl ketone until a dough-liquid mass is formed, continuing the stirring while maintaining a pH in the liquid mixture of at least 6 but which will not appreciably hydrolyze the cellulose ester, by adding a neutralizing agent at frequent intervals during the stirring until a constant pH of the liquid mixture is attained, then separating the dough from the liquid by decanting the liquid therefrom.

CARL J. MALM.
CARLTON L. CRANE.